Feb. 3, 1970  D. G. JUDGE, JR  3,493,450
HONEYCOMB CORE MACHINE AND METHOD
Filed Oct. 23, 1965  2 Sheets-Sheet 1
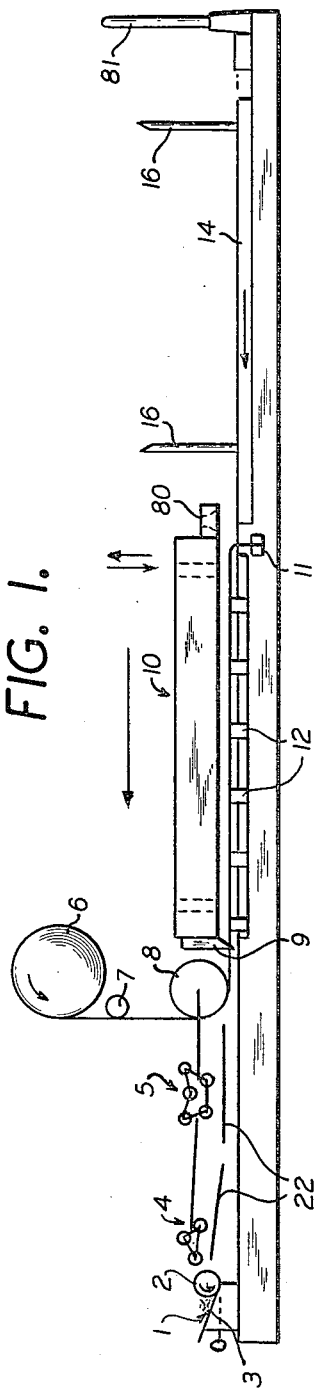
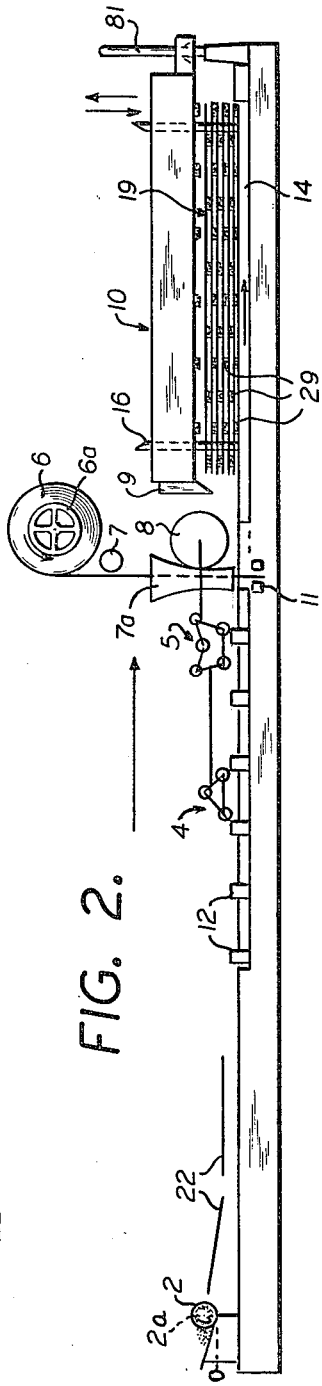
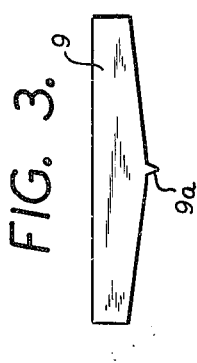
INVENTOR
DAN GORDON JUDGE, JR.
BY
James M. Heilman
ATTORNEY.

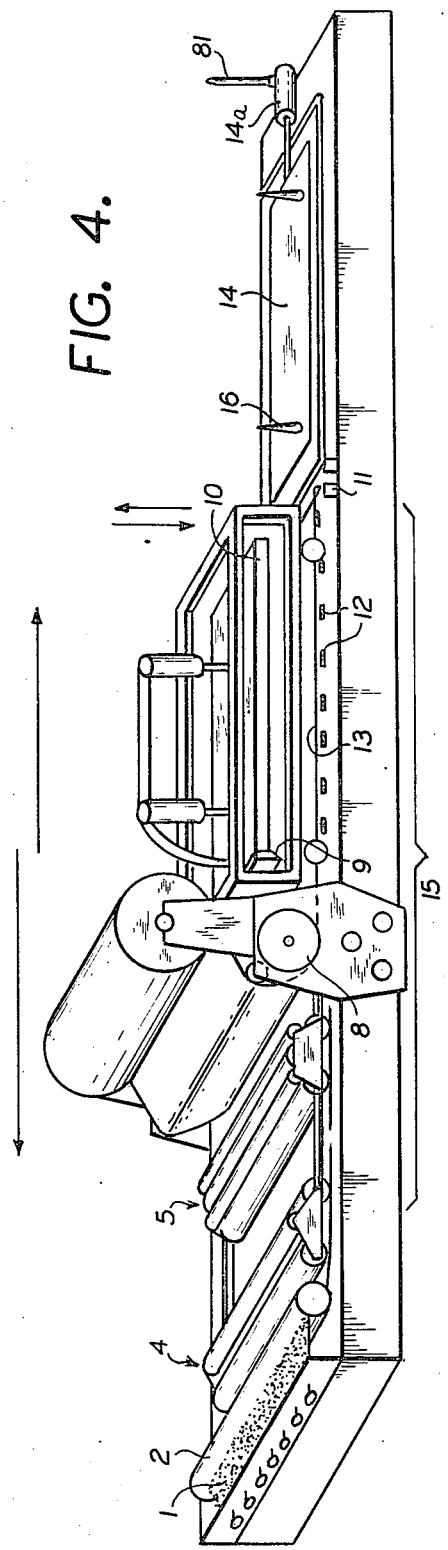
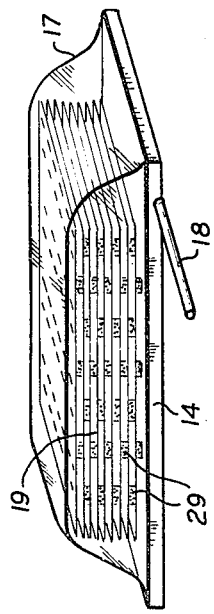
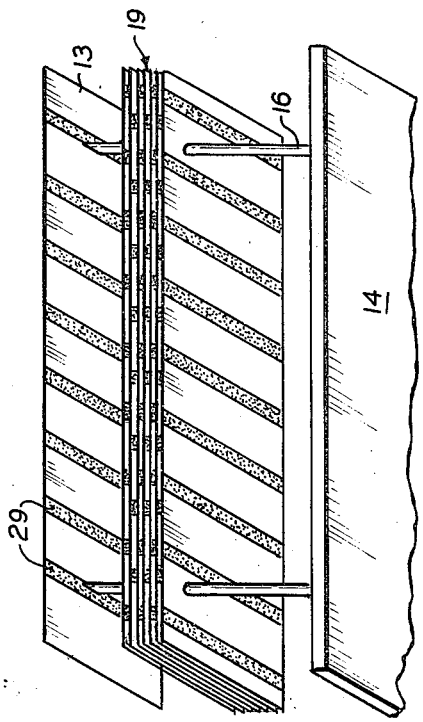

United States Patent Office 3,493,450
Patented Feb. 3, 1970

3,493,450
HONEYCOMB CORE MACHINE AND METHOD
Dan Gordon Judge, Jr., Sarasota, Fla., assignor to Honeycomb Company of America Inc., a corporation of New York
Filed Oct. 23, 1965, Ser. No. 503,304
Int. Cl. B31d 3/02; B32b 7/14, 31/04
U.S. Cl. 156—197                    19 Claims

ABSTRACT OF THE DISCLOSURE

This invention sets forth a method of manufacturing honeycomb core by first unrolling a material from a roll or web, applying adhesive to this material in series of parallel stripes by a concept of offset printing with a flat bed press, then cutting the stripped material to the desired length, picking it up off the bed of the machine and carrying it back to the stacking area on the same machine, and subsequently stacking the sheets so that the adhesive stripes on each sheet are alternated with the adhesive stripes on the preceding sheet, holding the sheets mechanically until the desired number of sheets have been stacked one upon the other, and then bonding the stacked sheets to each other under heat and pressure, and finally slicing the cured stacked sheets at right angles to the ahesive stripes and and expanding the slice to form honeycomb core material.

---

This invention pertains to a honeycomb core machine and method of making honeycomb cores, i.e., a multicellular, structural material. One of the objects of this invention is to provide a machine and process for efficiently manufacturing honeycomb cores by transverse striping and accurately aligning the transverse bonding strips.

Another object of this invention is to provide a unique mechanism (whenever mechanism or machine is used herein, it also includes the process thereof) for equally distributing and accurately applying adhesive to spaced transfer bars which in turn will accurately stripe a strip of material.

Another object is to provide a novel reciprocating transverse striping machine, and equipment to lay up and align accurately the alternate severed striped sheets. These laid-up sheets are then bonded together, cut to the proper width, and expanded to the desired sizes as pointed out in the currently filed Oct. 23, 1965, Ser. No. 503,703 by the same inventor, which application is incorporated herein in its entirety. Finally, the core is faced with any suitable facing material as is well known in the art.

With the foregoing and other objects in view, as will appear from a reading of the following specification and claims, the invention resides in the novel arrangement and combination of parts and in the details of construction and process of manufacture hereinafter described and claimed, it being understood that changes in the precise embodiment of the invention may be made without departing from the spirit of the invention. It will be further understood that the invention is susceptible of embodiment in many and various forms, some of which are illustrated in the accompying drawing and photographs, and that the structural details or particular steps of the method herein set forth may be varied to suit particular purposes and still remain within the inventive concept.

At the present time, lightweight, adhesively bonded structural honeycomb core materials are mainly manufactured by one of two processes.

The first of these processes is the corrugated or preformed type. In this method the material from which the honeycomb is to be made is formed or corrugated usually by means of forming rolls or process dies formed to the desired shape. Adhesive is then applied to the top and bottom of the corrugated sheets. Due to their configuration the adhensive coats only the crests or nodes as they pass through the glue machine. These coated sheets then are assembled in an alternate fashion so as to form honeycomb cores.

The assembly of these corrugated preformed sheets is normally accomplished by "hand lay-up" or hand assembly, requiring as many as five to six people to accomplish this one operation. The assembled block, as it is called, of honeycomb is then placed in a suitable oven at elevated temperature for curing the adhesive. While it is possible to make core by this process in long lengths, one of the principal disadvantages of this method is the fact that during the cure of the adhesive it is difficult to apply sufficient bonding pressure on the adhesive coated joints.

In bonding with adhesives that require a cure at elevated temperatures, it is normally desirable to apply as much pressure as possible on the joints during the cure of the adhesive in order to obtain the maximum bond strength from the cured adhesive.

The second method which is presently used to produce honeycomb core material is that of "laminated" or so-called "expanded core." In this process the material from which the honeycomb core is to be made is taken from a roll or coil and stripes of adhesive applied in parallel lines which are normally parallel with the edges of the coil and parallel to the direction of the web material. These adhesive lines are normally applied to each side of the sheet in an alternate pattern as the sheets pass through adhesive coaters.

This process normally requires the use of an adhesive that can be partly cured so as to bring the adhesive to a "dry to the touch" or "dry line" state. This is necessary to facilitate the stacking of one sheet upon the other and align the stripes of one sheet with the stripes of another without smearing the striped glue lines. This assembly is usually accomplished by cutting the web into sheets and then either jogging or shaking the sheets into proper alignment, or by folding one sheet back and forth upon itself in a "fan folding" operation so as to align the adhesive stripes on the sheets. This is followed by a curing of the flat pack, usually at elevated temperatures under mechanical pressure.

My invention makes the above mentioned alignment unnecessary. After the pack of flat laminated sheets has been cured as mentioned above, it is necessary to cut a slice or piece from this pack, and expand the piece by opening the cells by pulling the edges of the slice in opposite directions to form a honeycomb core.

The disadvantages of this process are that it is severely limited as to the lengths or ribbon direction of material that can be produced, and the present processes are capable of producing one or two standard lengths which are often-times uneconomical in application.

A further disadvantage to the present method is the process used to open the cells or expand the laminated stack. This is usually accomplished by attempting to pull the two outside plies or layers in opposite directions along the entire length, with the result that the stack is expanded throughout its entire length at the same time. This results in substantial stresses and strains being created within the slice being expanded since the slice must contract in width as it is stretched in length. Since this is being done to the entire length of the slice at one time, the stresses and strains incurred manifest themselves in distorted or misshapen cells. This is very undesirable in a structural honeycomb core since the physical properties of the core will vary depending on the geometrical shape of the cells and the variation in density of different areas of the core slices.

Therefore, more specific objects of this invention is to disclose a method involving several stages to produce unexpanded, laminated sheets which are capable after curing the adhesive of being expanded into honeycomb core. This method discloses the entire process of manufacture starting with the roll or web material, the application of adhesive stripes equally spaced and parallel but at 90° to the direction of the web material.

The adhesive is applied in a "wet state" and applied to the bottom of the sheet. Since the adhesive in the "wet state" will "wet" and adhere to the top or unstripped side of the previous sheet, this eliminates the necessity of matching or aligning dry glue lines to dry glue lines.

The adhesive printed sheets may be cut from the web at any desired length, and assembled one upon the other in an alternate fashion so as to alternate the stripped adhesive lines on one sheet in relation to the location of the stripped adhesive lines on the previous sheet. The cutting method is affected by shearing, combined with a vacuum picked principle for stacking, followed by the assembly process the method of mechanically holding the adhesive stripped sheets in accurate position during assembly and during the curing operation to complete the bonding of the sheets to each other under adequate pressure.

A final specific object is to disclose a unique method of applying bonding pressure to laminated flat sheets during the curing cycle of the adhesive bond lines, by use of vacuum, plus where desired, increased external pressure, such as autoclave bonding, or platen press bonding.

Referring to the figures generally:

FIG. 1 illustrates the honeycomb core machine in its forward, or home position;

FIG. 2 illustrates the machine in its rear position;

FIG. 3 is a front elevation of the severing knife;

FIG. 4 is a further view of the honeycomb machine in its forward position showing details of the lifting mechanism, and reciprocating stack aligning mechanism;

FIG. 5 is an enlarged detail view of the stacking pins showing a bonded sheet being positioned in the stack;

FIG. 6 illustrates a stack of striped sheets being pressed or bonded under a suction or vacuum; and FIG. 7 illustrates a bonded pack, of the desired width, partially cut through.

Referring in detail to the various major assemblies and major elements of the machine and describing their function, they are as follows:

Element No. 1 is an adhesive well and holds the reservoir of adhesive for the operation.

2 is the mother roll and is contained in the adhesive well housing and transfers adhesive from the well to other rolls. It has a ratchet 2a on the side.

3 is an adjustable doctor blade. This controls by scraping off excess adhesive from mother roll 2 and thereby regulates the amount of adhesive to be used.

4 are pickup rolls—a cluster of several rolls that pick up adhesive from mother roll 2 and spread it evenly on the adhesive dispersion plates 22.

5 are adhesive applicator rolls—a second cluster of rolls that pick up adhesive from the dispersion plates 22 and apply a controlled and even coating to the striping bars 12.

6 is the web or coil of material from which the honeycomb core is to be manufactured.

7 is a guide roll which helps guide the material from the roll or coil 6 into proper position.

8 indicates the pressure roll—a large powered roll mounted within the carriage assembly 15 on the machine behind the coil or web 6 for the purpose of applying positive pressure on the sheets as they are unwound from the coil or web and repose on the striping bars.

9 is the shear mechanism, knife, or quillotine built into the traveling portion of the machine to cut sheets from the coil or web 6 after they have been unwound and coated with adhesive.

10 is the vacuum pickup and comprises a flat vacuum plate which moves up and down, as well as forward and backward with the traveling portion of the machine. This vacuum plate picks up by mechanical means the adhesive coated sheet from the bed of the machine and the striped printing area after it has been coated with adhesive and cut to size.

11 is the gripper or clamping mechanism which when activated, mechanically holds one end of the material so that it may be uncoiled or unwound from the coil or web 6 by the forward movement of the carriage assembly 15.

12 are striped bars or ribbing printed sections. The raised section of metal or other rigid material are in parallel lines, equally spaced, but at 90° to the length of the coil or web material. The adhesive is applied to the top of the ribs or raised area of striping bars by the applicator rolls 5.

13 is a printed sheet which has been cut from the coil.

14 is the shuttle platen. This area is located on the rear end of the machine bed where the printed sheets are stacked. This platen moves mechanically and automatically forward and backward alternately each time a sheet is printed so that when sheets 13 are stacked, the alternate movement of this platen, a predetermined amount each time, usually half the distance of the spacing of the parallel adhesive lines, accomplishes the indexing or proper registration between sheets. This resulting movement places the adhesive stripes of one sheet directly centered between the adhesive stripes of the preceding sheet.

15 is the entire carriage assembly containing the pickup rolls 4, the adhesive applicator rolls 5, the web or coil 6, the guide roll 7, the pressure roll 8, the shear mechanism 9, and the vacuum pickup plate 10. These units contained in this carriage assembly are powered and move as a unit mechanically on wheels and gears back and forth on the bed of the machine. The individual items are mechanically powered and function in a coordinated manner so as to accomplish the application of adhesive to the bars 12, the unrolling of the sheets 13, the application of pressure on the sheets to assure transfer of the adhesive to the sheet, the cutting to length of the sheet, the lifting of the printed sheet from the bed or stripe bars, and the subsequent stacking of the sheets on the shuttle platen 14.

16 indicates the stacking pins. These pins or spikes are attached to the shuttle platen 14 and move with it. When the vacuum plate 10 delivers a printed sheet 13, the guide ring 80 engages guide rod 81, and the stacking pins pierce the sheet as the vacuum plate comes down on top of them and thus result in a mechanical lock of the sheet to the shuttle platen 14. The sheets are held in accurate registration and any movement of the individually printed sheets is prevented and any possibility of smearing the printed adhesive stripes on the sheet is eliminated.

17 is a vacuum bag, while 18 indicates a vacuum exhaust line, and 19 a stack of laminated sheets.

20 is a slice of bonded sheets to be expanded cut from the pack 20.

22 is the adhesive dispersion plates. Smooth flat surfaces where the adhesive may be spread uniformly to insure consistent and uniform application.

29 indicates the adhesive glue lines, i.e., the adhesive strips that have been printed on the sheets.

METHOD OF MANUFACTURE

As mentioned above, it is a specific object of this invention to disclose a complete method for the manufacture of unexpanded, expansible laminated sheets to form honeycomb structural core material.

Specifically, a method of manufacture of unexpanded, expansible laminated sheets consists of the following steps:

The desired adhesive, the type of which may vary depending on the material to be bonded, is placed in the adhesive well 1, is picked up by the mother roll 2 contained in the well. Doctor blade 3, also located in the well, regulates the amount of adhesive dispersed by the mother roll 2. The cluster of three or more adhesive pickup rolls 4 move forward when the machine is activated and travel to the adhesive well 1 coming in physical contact with mother roll 2. The mother roll is provided with a ratchet on the end that moves a prescribed distance each time the ratchet 2a is touched by the frame or carriage assembly 15 carrying rolls 4. When the machine moves in the opposite direction, away from the adhesive well 1, the pickup rolls 4 deposit the adhesive it has picked up from the mother roll 2 on the adhesive dispersion plates 22.

Another cluster of adhesive applicator rolls 5 picks up the controlled amount of adhesive which has been evenly distributed on the dispersion plates 22, and applies this adhesive to the top surfaces of the ribbed printing area 12. This type of ribbed printing area has parallel lines of metal or other rigid material strips of desired thickness equal to the desired width of bonded areas. These strips are equally spaced apart, approximately three times the width of each rib or stripe. The parallel printing lines are across the width of the machine and are in the transverse direction of the web or coil material from which the honeycomb is being made.

The pickup rolls 4, the applicator rolls 5, the web or coil 6, the guide roll 7, the pressure roll 8, the shear mechanism, knife, or guillotine 9, and the vacuum pickup plate 10 are all built into a carriage assembly 15 which travels by mechanical means forward and backward on the machine bed.

The coil or web of material 6 from which the honeycomb core is to be made has one end held securely by the gripper or clamping mechanism 11. The coil may be of any flexible material, such as, aluminum, paper, fabric, glass fibers, etc. The end of the web or coil is placed in this gripper 11 after being properly located by the guide roll 7. The gripper 11 then closes tightly holding the material in place so that when the machine then moves to the forward position for the second time the coil or web 6 of material is then unwound or unrolled on the surface of the type or stripping ribbed sections 12 which has been coated with adhesive by the adhesive applicator rolls 5.

The pressure roll 8 moves in conjunction with the forward movement of the machine following web 6 and applying pressure on the web at its being uncoiled from the roll, and pressing it firmly against the printing area 12 to insure proper and complete transfer of the adhesive from the bars to the underside of the sheet. The machine then stops in the forward position and the vacuum pickup plate 10 which also has moved to the forward position then comes down on the sheet.

The knife or shear mechanism 9, provided with a sharp starting point 9a, is attached to the vacuum plate, and cuts the web to the desired length. This is regulated by the distance that the machine moves forward and backward, and may be made any length by simply changing the location of the gripper mechanism 11 so that the material is started to unroll from any given point. After the sheet has been cut by the guillotine 9 the gripper mechanism 11 at the end of the machine bed is automatically opened releasing the other end of the sheet uncoiled from the coil 6. The vacuum pickup plate 10 which has come down at right angles to the sheet lying on the bed (see arrows on FIGS. 1 and 4) carefully lifts the sheet at right angles from the bed of the machine by use of vacuum and/or other mechanical holding method. The sheet is lifted mechanically in such a manner so as to eliminate the possibility of smearing the wet adhesive lines which have just been printed on the bottom of the sheet.

The entire carriage assembly then moves mechanically to the reverse position at which time the vacuum pickup plate 10 sets the printed sheet 13 down on the shuttle platen 14. This shuttle plate is moved forward or backward alternately each time a sheet is printed by cylinder 14a. Therefore, when sheets 13 are stacked on the shuttle platen or plate every other sheet is alternated or indexed so that the stripped adhesive lines printed on the sheets, in a parallel fashion, are located approximately in the middle of the spacing of the adhesive lines printed on the previous sheet. The shuttle platen then moves again to the opposite position causing the next sheet to be stacked in the same position as the original sheet with the adhesive lines parallel but alternate to the previous sheet. This pattern or indexing is repeated automatically each time a sheet is printed and stacked with the resulting adhesive lines being alternated on every other sheet as illustrated in FIGURE 5.

In order to hold the printed sheets 13 in the proper position during the stacking operation, and to prevent their movement during the time the stack is being assembled on the shuttle platen 14, stacking pins 16 have been provided. These stacking pins 16 pierce the sheet while it is still held on the vacuum platen 10 and after the vacuum plate has automatically released the sheet. When the sheets are held in this fashion they are mechanically held in proper registration during the stacking and subsequent curing of the adhesive bond lines. These stacking pins 16 may be removed either prior to cure of the adhesive or after the final curing of the adhesive has been accomplished.

After the vacuum pickup plate 10 has desposited the printed sheet 13 on the shuttle platen 14 it moves forward with the rest of the carriage assembly 15 to repeat the process.

The operator, either automatically, or manually by means of a hand wheel 6a, unwinds from coil 6 a sufficient amount of web material which passes against conventional guide 7 into the chute 7a and subsequently into grippers 11 which are then automatically closed and the operator starts the complete cycle over again by any suitable automatic means or manual means, such as a conventional push button control. The process described above may be repeated to accomplish the printing and stacking of as many sheets as desired. When the desired number of sheets have assembled, the shuttle platen 14, with the sheets assembled on it and held in place by the stacking pins 16, is removed from the machine bed and replaced with another identical part so as to allow continuous use of the machine.

The shuttle platen 14 with the sheets assembled on it is then covered with a vacuum bag 17 and this bag is sealed to the shuttle plate as illustrated. The entrapped air in this bag is then removed by means of a vacuum exhaust line 18. The result is that the vacuum bag 17 applies fluid pressure to the stack of sheets holding them under pressure against the shuttle platen 14. Vacuum pressure is kept on the stack during the cure cycle of the adhesive used to bond the sheets. Normally these adhesives are of the thermosetting type, particularly for aluminum, which require the application of heat to effect the full cure of the adhesive. This invention is not confined, however, to the use of only thermosetting adhesives, since there are a number of adhesives that will effect a cure at room temperature.

In the case of the thermosetting adhesives, the stack of sheets is placed in a suitable oven, autoclave, or hot plate laminating press or other suitable heating device, for such length of time and at the desired temperature until the adhesive has been fully cured. Subsequently, the stack is cut into slices 20 as illustrated in FIG. 7.

The next step in this process is the expansion of the laminated sheets of unexpanded, expansible honeycomb core as set forth in detail in my above mentioned application, Ser. No. 503,703, filed Oct. 23, 1965.

What is claimed is:

1. A method for manufacturing honeycomb core comprising the steps of transferring adhesive from an applicator roll to spaced apart striping means on a flat bed plate, unrolling a web of material from a coil, gripping and retaining the end of said web in a gripper while unrolling and forcing said web against the adhesive coated striping means whereby to transfer adhesive from said striping means to said web in spaced apart stripes at right angles to the edge of said web, shearing the web across its entire width, and stacking a plurality of said sheets in such a manner as to alternate the adhesive stripes of one sheet in relation to the adhesive stripes of a preceding sheet to form a honeycomb pack.

2. A method as set forth in claim 1 plus the additional steps of providing a movable stacking pin, applying a vacuum to said spaced adhesively coated sheared sheet of the web, raising said sheet and forcing said coated sheet to be impaled on said pin, moving said pin a distance equal to half the distance between the coated stripes and repeating the above steps whereby to vertically align the coated adhesive stripes of alternate sheets as they are stacked.

3. A method for holding adhesive coated sheets in proper alignment and registration during the assembly of one sheet upon another by using a vacuum plate when forming a stack of sheets to manufacture honeycomb core comprising moving a shuttle platen with upstanding piercing stakes back and forth with each cycle of the vacuum plate, piercing each adhesive coated sheet as said vacuum plate descends on top of said spikes to mechanically hold the adhesive coated sheets in proper alignment while assembling a plurality of sheets to form a honeycomb pack and while subsequently curing the pack.

4. A method for the manufacture of a multi-cell structure, such as honeycomb core material comprising coating with adhesive spaced apart, upstanding ribs on a bed, unrolling a web of material onto the previously coated ribbed bed at right angles to the coated ribs, applying pressure to the web material to insure positive contact with the adhesive coated ribs and to transfer the adhesive in the wet state to the bottom of the web in spaced apart stripes after being unrolled, cutting the adhesive printed web into a separate sheet, picking up the severed adhesively coated sheet, and subsequently stacking said sheet upon a sheet previously coated with stripes of adhesive in the same manner in such a fashion as to alternate the adhesive stripes of one sheet in relation to the adhesive stripes of the previously coated sheet to form a honeycomb pack.

5. A method as set forth in claim 4 further characterized by moving a shuttle platen with upstanding piercing stakes back and forth with each cycle of a vacuum plate, piercing each adhesive coated sheet as said vacuum plate descends on top of said stakes, and thus holding by mechanical means the adhesive coated sheets while assembling many sheets to form a honeycomb pack, and during the subsequent cure of the pack.

6. A method as set forth in claim 5 including the additional steps of sealing a vacuum bag around a stack of sheets, removing the air from the sealed bag to apply fluid pressure to the sheets, and supplementing this fluid pressure with positive external pressure.

7. A method as set forth in claim 4 including the additional step of bonding the stack of striped sheets under heat and pressure applied by using a hot plate laminating press.

8. A method as set forth in claim 4 including the additional step of bonding the stack of striped sheets under heat and pressure applied by using an autoclave.

9. A method for manufacturing honeycomb material comprising the steps of transferring adhesive in sequence from an applicator roll to striping bars, unrolling a web of material from a coil, clamping the end of said web in a gripper, retaining the end of said web in said gripper, unrolling said web by exerting pressure thereagainst while simultaneously forcing the web in contact with the adhesive coated striping bars to transfer adhesive from said bars to the web in stripes at right angles to the longitudinal edges of said web, piercing and shearing the web across its entire width, applying a vacuum to said spaced adhesively coated sheared sheet of the web, raising said coated sheet, and forcing said sheet to be impaled on movable pins, moving said pins a distance equal to half the distance between the coated stripes, and repeating the above steps whereby to vertically align the coated stripes of every second sheet and removing the stack when sufficient sheets have been received to form a stack.

10. A method for manufacturing structural honeycomb core material comprising the steps of transferring adhesive in sequence from a mother roll to a series of pick-up rolls—to dispersions plates—to applicator rolls and finally to spaced apart striping bars; unrolling a web of material from a coil past a pressure roller, and clamping the end of said web in a gripper, unrolling said web by inserting pressure thereagainst by means of the pressure roller, simultaneously forcing the web against the adhesive coated striping bars with said pressure roller to transfer adhesive from the bars to the web in spaced apart stripes at right angles to the edges of said web, shearing the web across its entire width, and stacking a plurality of said sheets in such a manner as to alternate the adhesive stripes of one sheet in relation to the adhesive stripes of a preceding sheet to form a honeycomb pack.

11. A method for manufacturing structural honeycomb core material comprising the steps of transferring adhesive in sequence from a mother roll to a pickup roll, to a dispersion plate, to an applicator roll, and finally to spaced apart striping bars; unrolling a web of material from a coil past a guide roller, and a pressure roller, and clamping the end of said web in said gripper, and unrolling said web by exerting pressure thereagainst by means of said pressure roller while simultaneously forcing the web against the adhesive coated striping bars to transfer adhesive from the bars to the web at right angles to the edges of said web, piercing said web with a sharp point of a shear and shearing the web across its entire width, applying a vacuum to said spaced adhesively coated sheared sheet of said web, raising said sheet above the height of movable stacking pins, and forcing said coated sheets to be impaled on said pins, moving said stacking pins a longitudinal distance equal to half the distance between the center of the coated stripes, and then repeating the above steps to vertically align the coated stripes of alternate sheets as they are stacked, removing the stack when sufficient sheets have been received, placing said sheets under a bonding force to bond all said sheets together, expanding the bonded sheets to the desired width, and facing the expanded sheets with a suitable surface material.

12. A method for manufacturing structural honeycomb core material comprising the steps of transferring adhesive in sequence from a mother roll to a series of pickup rolls, to dispersion plates, to applicator rolls, and finally to spaced apart striping bars; unrolling a web of material from a coil past a guide roller and a pressure roller, and clamping the end of said web in a gripper; retaining the end of said web in said gripper and unrolling said web exerting pressure thereagainst by means of said pressure roller while simultaneously forcing the web against the adhesive coated striping bars to transfer adhesive from the bars to the web at right angles to the edges of said web, piercing said web near its center with a sharp point of a cutter and subsequently cutting the web across its entire width, applying a vacuum to said spaced, adhesively coated cut sheet of said web, raising said sheet above the height of movable stacking pins, and forcing said coated sheets to be impaled on said pins, moving said stacking pins a longitudinal distance equal to half the distance between the coated stripes, and then repeating the above steps to vertically align the coated stripes of alternate sheets as they are stacked, removing the stack when sufficient sheets have been received, placing said sheets in a vacuum bag, applying a vacuum thereto to bond all said sheets together, subsequently expanding the bonded sheets to the desired width, and facing at least one side of the expanded core with a suitable panel surface material.

13. A device for making honeycomb core comprising a longitudinal movable unitary carriage assembly comprising a vacuum pickup device and a knife, means for holding a coil of web material, and an adhesive applicator roll; a frame member comprising adhesive distributing plates, a series of striping bars, and clamping means; said adhesive applicator roll being movable over the adhesive distributing plates to pick up adhesive and deposit it on said striping bars, and said knife being movable to sever said web into coated sheets while lying on said coated striping bar so that the severed coated sheets may be picked up by the vacuum pickup device and stacked into a honeycomb pack.

14. A device for making structural honeycomb core comprising a longitudinal movable unitary carriage assembly comprising a vacuum pickup device and a knife, means for holding a coil of web material, and an adhesive applicator roll; a frame member comprising adhesive distributing plates; a series of striping bars and clamping means; said adhesive applicator roll being movable over said adhesive distributor plates to pick up and deposit adhesive on said bars, and a reciprocating shuttle platen with stacking pins thereon, and a guide rod, said entire unitary carriage assembly being movable over the striping bars and shuttle platen, and said vacuum pickup device and knife being movable also in a direction at right angles to said striping bars and shuttle platen whereby said web may be severed into coated sheets while lying on said coated striping bar, and subsequently moved and impaled on said stacking pins on said reciprocating shuttle platen by guiding said vacuum pickup device with said guide rod to properly and alternately align said severed coated sheets.

15. A device for making structural honeycomb core comprising a longitudinal movable unitary carriage assembly comprising a vacuum pickup device and a knife, means for holding a coil of web material, and adhesive applicator rolls; a frame member comprising a mother roll, a series of striping bars and clamping means; said mother roll distributing adhesive to said adhesive applicator rolls, and a reciprocating shuttle plate with stacking pins, and a guide rod; said unitary carriage assembly being movable to transfer adhesive to the striping bars from said adhesive applicator rolls, and said vacuum pickup device and knife being movable also in a vertical direction toward and away from said coated striping bars whereby said web may be severed into coated sheets which are subsequently impaled on said stacking pins on the reciprocating shuttle plate by guiding said vacuum pickup device with said guide rod to properly and alternately align said coated sheets.

16. A device for making structural honeycomb core comprising a frame; a longitudinal movable unitary carriage assembly on said frame comprising a vacuum pickup device and a knife, means for holding a coil of web material, a pressure roller, adhesive pickup rolls, adhesive distributing plates and adhesive applicator rolls; an adhesive well, an adjustable doctor blade, and a mother roll at one end of said frame, and clamping means near the center of said frame; said adhesive pickup rolls being operatively associated with said adhesive well, doctor blade, and mother roll to transfer adhesive to said distributing plates and a reciprocating shuttle plate with stacking pins, and a guide rod at the other end of said frame, said unitary carriage assembly being movable over the adhesive distributing plates to pick up adhesive by means of said applicator rolls and deposit the adhesive on said striping bars, means to place the web on said coated striping bars while gripping the end of said web with said clamping means, a reciprocating shuttle plate, and said vacuum pickup device and knife being movable also in a vertical direction whereby said coated web may be severed into coated striped sheets while lying on said coated striping bars, and subsequently moved and impaled on stacking pins on said reciprocating shuttle plate as said pickup device is guided by said guide rod on said frame to properly and alternately align said coated sheets.

17. A machine for making honeycomb core comprising distributing plates for evenly and efficiently distributing adhesive, a series of striping bars to receive adhesive from said distributing plates, means for holding a coil of web material to be coated, clamping means to grip the end of said web, means to force the web to unroll and contact the coated striping bars in a transverse manner, a vacuum pickup device, a knife carried by said pickup device to sever said coated web into individual sheets, said pickup device carrying said coated sheets, a reciprocating shuttle plate and a pair of stacking pins thereon whereby the coated sheets carried by said pickup device will be impaled on the said stacking pins of the reciprocating shuttle plate so that its glue stripes are intermediate the glue stripes of the adjacent sheet, but aligned with every other sheet.

18. A machine for making honeycomb core for panels comprising a cluster of applicator rolls for evenly and efficiently distributing adhesive, a series of striping bars over which said cluster rides to deposit adhesive, means for holding a coil of web material to be coated with adhesive, a pressure roller, clamping means to grip the end of said web after which the pressure roller forces the web to unroll and contact the coated striping bars in a transverse manner, a vacuum pickup having a positioning ring thereon, a knife carried by said pickup device and having a centrally located puncturing point to sever said web into individual coated sheets whereby when said vacuum pickup assembly is lowered upon said coated web, the puncturing point will start the tear which will be completed by said knife, and a guide rod whereby said positioning ring of the vacuum pickup will engage the guide rod, and the coated sheets carried by said vacuum pickup assembly will be impaled on said stacking pins of the reciprocating shuttle plate so that the glue stripes on each sheet are intermediate the glue stripes of the adjacent sheet, but aligned with every other sheet.

19. A machine for making structural honeycomb core for panels comprising a mother roll, a cluster of pickup rolls, distributing plates, and a cluster of applicator rolls cooperating to evenly and efficiently distribute adhesive, a series of striping bars over which said clusters of applicator rolls ride to deposit adhesive, means for holding a coil of web material, a guide roller, and a pressure roller, clamping means to grip the end of said web after which the pressure roller forces the web to unroll and contact the coated striping bars in a transverse manner to coat said web with stripes of adhesive, a vacuum pickup assembly comprising a positioning ring on its forward end and a knife having a centrally located puncturing point to sever said coated web into individual sheets whereby when said vacuum assembly is lowered upon said web, the puncturing point will start the tear which will be completed by said knife, a reciprocating shuttle plate and a pair of stacking pins thereon, and a guide rod whereby said positioning ring of said vacuum pickup carrying the coated sheet will engage the guide rod, and the coated sheets will be impaled on the stacking pins of the reciprocating shuttle plate so that glue stripes on each sheet are positioned intermediate the glue stripes of the adjacent sheet, but aligned with every other sheet.

References Cited

UNITED STATES PATENTS

| | | | |
|---|---|---|---|
| 3,242,024 | 3/1966 | Bova et al. | 156—548 |
| 3,438,830 | 4/1969 | Harnsworth | 156—578 |
| 2,518,164 | 8/1950 | Meyer | 156—513 |
| 2,783,176 | 2/1957 | Boicey | 161—248 XR |
| 2,878,953 | 3/1959 | Mitchell | 156—571 XR |
| 2,983,640 | 5/1961 | Knoll et al. | 156—197 |

JOHN T. GOOLKASIAN, Primary Examiner

D. J. FRITSCH, Assistant Examiner

U.S. Cl. X.R.

156—291, 512, 548, 558, 563